United States Patent
Caforio et al.

(10) Patent No.: US 11,498,369 B2
(45) Date of Patent: Nov. 15, 2022

(54) TYRE FOR VEHICLE WHEELS

(71) Applicant: Pirelli Tyre S.p.A., Milan (IT)

(72) Inventors: Stefano Caforio, Milan (IT);
Alessandro Castellini, Milan (IT);
Fabio Montanaro, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 673 days.

(21) Appl. No.: 16/074,893

(22) PCT Filed: Feb. 8, 2017

(86) PCT No.: PCT/IB2017/050684
§ 371 (c)(1),
(2) Date: Aug. 2, 2018

(87) PCT Pub. No.: WO2017/137903
PCT Pub. Date: Aug. 17, 2017

(65) Prior Publication Data
US 2019/0039419 A1    Feb. 7, 2019

(30) Foreign Application Priority Data

Feb. 9, 2016  (IT) ................. UB2016A000577

(51) Int. Cl.
*B60C 11/11*   (2006.01)
*B60C 11/12*   (2006.01)

(52) U.S. Cl.
CPC ...... *B60C 11/1218* (2013.01); *B60C 11/1236* (2013.01); *B60C 11/1281* (2013.01); *B60C 2011/1213* (2013.01); *B60C 2200/06* (2013.01)

(58) Field of Classification Search
CPC ......... B60C 2011/1213; B60C 11/1281; B60C 2200/06; B60C 11/1218; B60C 11/11
See application file for complete search history.

(56) References Cited

U.S. PATENT DOCUMENTS

2007/0017618 A1* 1/2007 Miyasaka ............... B60C 11/13
                                                              152/DIG. 3
2008/0185085 A1    8/2008 Ohashi
(Continued)

FOREIGN PATENT DOCUMENTS

CN    104271366 A    1/2015
CN    104837651 A    8/2015
(Continued)

OTHER PUBLICATIONS

Notification of the First Office Action dated Jan. 22, 2020, from China National Intellectual Property Administration, in counterpart Chinese Application No. 201780010539.7.
(Continued)

*Primary Examiner* — Alison L Hindenlang
*Assistant Examiner* — Debjani Roy
(74) *Attorney, Agent, or Firm* — Finnegan, Henderson, Farabow, Garrett & Dunner, L.L.P.

(57) ABSTRACT

Tyre for vehicle wheels, comprising a tread band having a plurality of blocks, at least some of said blocks comprising at least one sipe (30) extending from an axially outer portion of the block up to an axially inner portion of the block along a predetermined trajectory and from a radially outer face of the block towards a radially inner portion of the block. The sipe (30) comprises, in any cross-section perpendicular to said predetermined trajectory, a main portion (400) having a first radial dimension and a first transversal dimension and, in a radially inner position with respect to the main portion (400) and adjacent to the radially inner portion of the block, a bottom portion (450) having a second radial dimension smaller than the first radial dimension and a second transversal dimension greater than the first transversal dimension. The second transversal dimension measured in a first cross-section of the sipe (30) taken at at least one of said axially (Continued)

outer portion of the block and said axially inner portion of the block is greater than the second transversal dimension measured in a second cross-section of the sipe (30) taken at a portion of the block axially arranged between said axially outer portion of the block and said axially inner portion of the block. The sipe (30) comprises an axially outer portion (83), an axially inner portion (84) and a central portion (82) defined between said axially outer portion (83) and said axially inner portion (84). The sipe (30) comprises, in said central portion (82), at least one area in which said predetermined trajectory is not rectilinear.

24 Claims, 5 Drawing Sheets

(56) References Cited

U.S. PATENT DOCUMENTS

| 2009/0159167 | A1* | 6/2009 | Scheuren | B60C 11/1281 |
| | | | | 425/470 |
| 2011/0265926 | A1 | 11/2011 | De Staercke | |
| 2012/0234443 | A1* | 9/2012 | Kurokawa | B60C 11/1281 |
| | | | | 152/209.18 |
| 2015/0251499 | A1* | 9/2015 | Jin | B60C 11/1218 |
| | | | | 152/209.21 |

FOREIGN PATENT DOCUMENTS

| CN | 105829136 A | 8/2016 | |
| EP | 0 914 974 A2 | 5/1999 | |
| EP | 1170153 A1 | 1/2002 | |
| EP | 2 492 117 A1 | 8/2012 | |
| EP | 2660081 A1 | 11/2013 | |
| JP | H0195913 A | 4/1989 | |
| JP | H04372406 | * 12/1992 | ............. B60C 11/12 |
| JP | 2005-262973 A | 9/2005 | |
| JP | 2007-0455316 A | 2/2007 | |
| WO | WO 2009/077807 A1 | 6/2009 | |
| WO | WO 2012/001488 A1 | 1/2012 | |
| WO | WO 2014/001069 A1 | 1/2014 | |
| WO | WO 2014/068385 A1 | 5/2014 | |
| WO | WO 2015/114128 A1 | 8/2015 | |

OTHER PUBLICATIONS

International Search Report form the European Patent Office in corresponding International Application No. PCT/IB2017/050684 dated May 30, 2017.

Written Opinion of the International Searching Authority from the European Patent Office in corresponding International Application No. PCT/IB2017/050684 dated May 30, 2017.

* cited by examiner

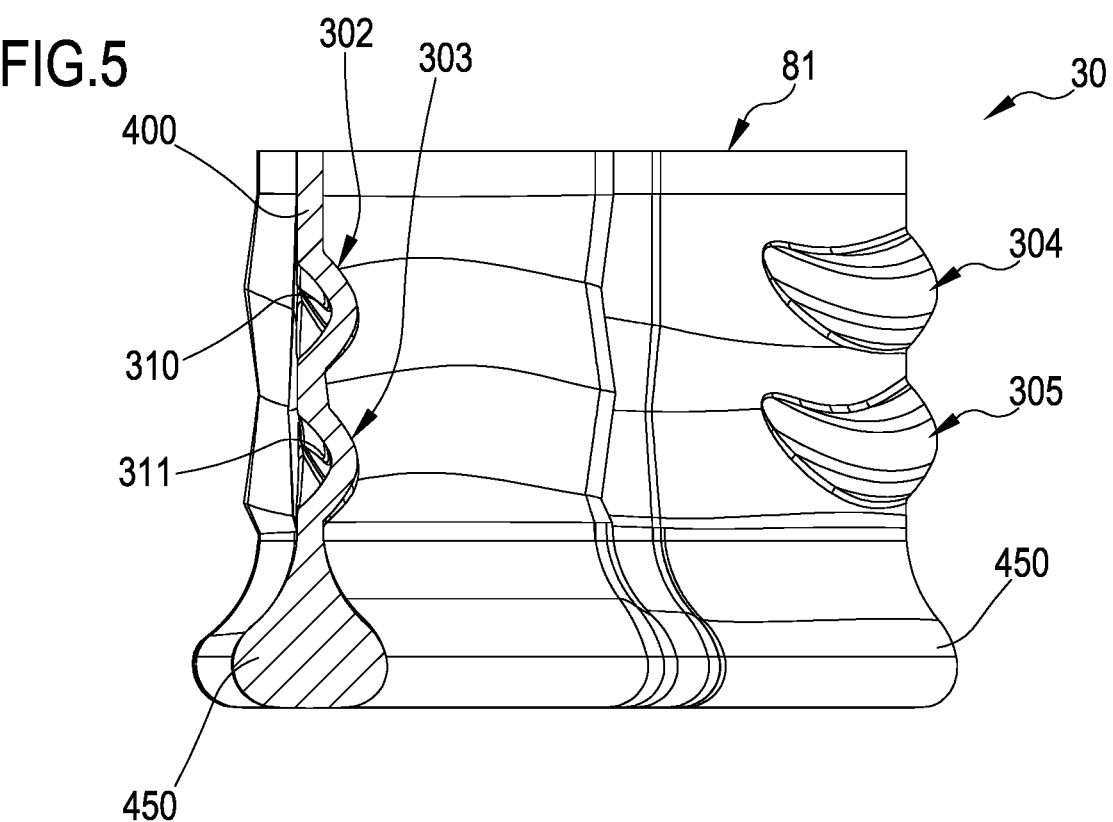
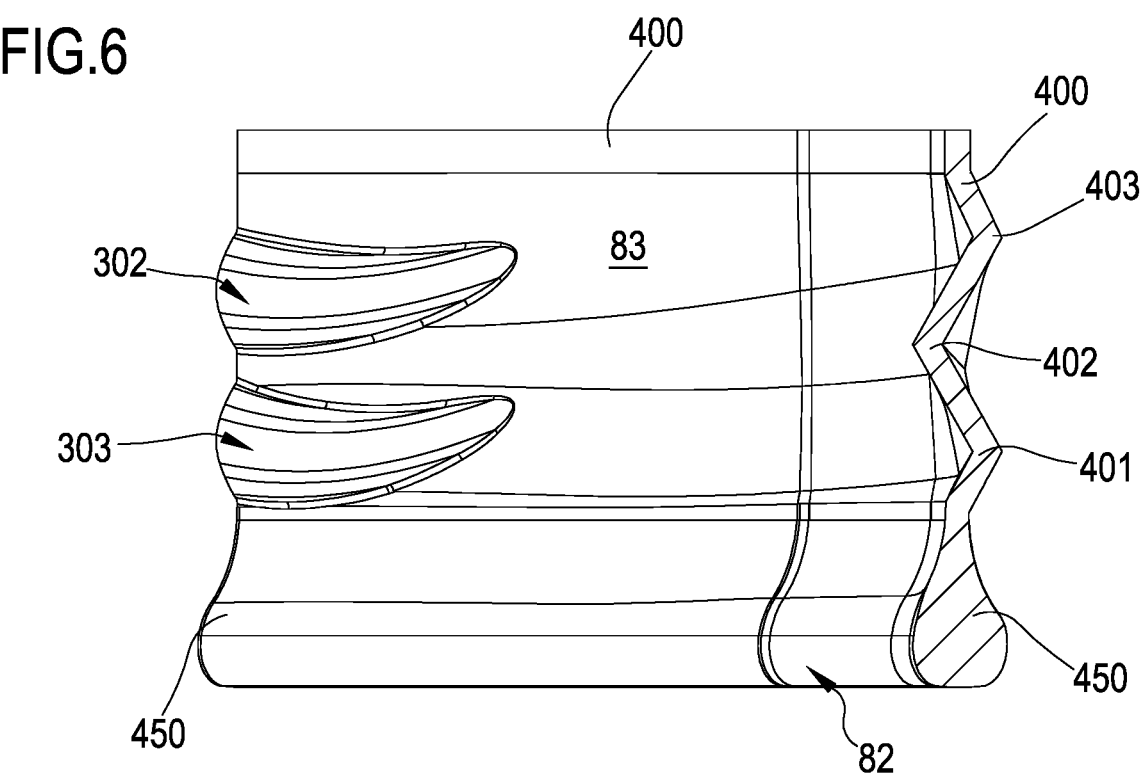

TYRE FOR VEHICLE WHEELS

CROSS REFERENCE TO RELATED APPLICATIONS

This application is a Section 371 national phase application based on International Application No. PCT/IB2017/050684, filed Feb. 8, 2017, which claims the priority of Italian Patent Application No. UB2016A000577, filed Feb. 9, 2016; the content of each application expressly incorporated herein by reference.

The present invention relates to a tyre for vehicle wheels, in particular for wheels of heavy vehicles.

The expression: "heavy vehicle" is used to indicate a vehicle belonging to categories M2~M3, N2~N3 and O2~O4 defined in "Consolidate Resolution of the Construction of Vehicles (R.E.3) (1997)", Annex 7, pages 52-59, "Classification and definition of power-driven vehicles and trailers", like for example lorries, trucks, tractors, buses, vans and other vehicles of this type.

The tyres intended to be used on heavy vehicles typically must have excellent characteristics of traction, acceleration, driveability and controllability (or lateral stability), both on dry road surfaces and on wet or snow-covered road surfaces.

Such characteristics also depend on the pattern of the tread band of the tyre, and in particular on the geometry of the grooves and of the sipes of the tread band.

PRIOR ART

WO 2009/77807, WO 2012/001488 and WO 2014/068385 describe tyres for wheels of heavy vehicles.

WO 2015/114128, US 2011/0265926, US 2008/0185085 and EP 0914974 describe various geometries of sipes.

SUMMARY OF THE INVENTION

Throughout the present description and in the subsequent claims, the following definitions apply.

The term "equatorial plane" is used to indicate a plane perpendicular to the rotation axis of the tyre and dividing the tyre into two symmetrically equal parts.

The terms "radial" and "axial" and the expressions "radially inner/outer" and "axially inner/outer" are used with reference, respectively, to a direction perpendicular and to a direction parallel to the rotation axis of the tyre, whereas the terms "circumferential" and "circumferentially" are used with reference to the direction of the annular extension of the tyre, i.e. to the rolling direction of the tyre, which corresponds to a direction lying on a plane coinciding with or parallel to the equatorial plane of the tyre. Therefore:

"radial direction" is used to indicate a direction substantially perpendicular to the rotation axis of the tyre;

"axial direction" is used to indicate a direction parallel to the rotation axis of the tyre, or inclined with respect to such an axis by an angle lower than 45°;

"circumferential direction" is used to indicate a direction parallel to the rolling direction of the tyre, or inclined with respect to the rolling direction by an angle lower than 45°.

The term "groove" is used to indicate a recess formed in the tread band of the tyre and having a width greater than 2 mm.

The term "block" is used to indicate a portion of tread band delimited by grooves both in the axial direction and in the circumferential direction. In the case in which the block is positioned on the axially outermost portion of the tread band, it is delimited in the axial direction by the axially outermost face of the tread band and, in the axially innermost position, by a circumferential groove.

The term "cross section" of the block is used to indicate a section of the block taken on a plane parallel with respect to the equatorial plane.

The term "sipe" is used to indicate a thin notch formed in a block and extending from an axially outer portion of the block to an axially inner portion of the block along a trajectory defined by a single rectilinear or curved line or by a broken line, whereby the term "broken line" is used to indicate a line comprising two or more consecutive straight lines which are inclined with respect to one another.

The sipe therefore defines in the block two circumferentially adjacent block portions. The sipe has, in a cross section of the block, a width not greater than 2 mm.

The term "longitudinal direction" of the sipe is used to indicate the main direction of extension of the sipe.

The term "trajectory" is used to indicate the path along which the sipe extends between the two opposite axial ends thereof.

The term "cross section" of the sipe is used to indicate a section of the sipe taken on a plane perpendicular to the trajectory of the sipe.

The term "transversal dimension" of the sipe is used to indicate the maximum width of the sipe measured in a cross section of the sipe taken in any point of the trajectory.

With reference to a sipe or to a portion thereof, the terms "widen" or "widening" and "narrow" or "narrowing" are used with reference to a cross section of the sipe. Therefore, a widening of the sipe results in an increase in the transversal dimension of the sipe, whereas a narrowing of the sipe results in a reduction of the transversal dimension of the sipe.

The Applicant is convinced that the sipes contribute to provide the tyre with the desired characteristics of traction and acceleration. The sipes also contribute, in the case of a wet road surface, to carrying away water and, in the case of a snow-covered road surface, to the trapping of snow in the ground-contacting area of the tyre, thus obtaining during driving a contact between tyre and road surface of the snow/snow type, which gives the tyre greater traction.

The Applicant has observed that during the rolling of the tyre the sipes are subjected to a continuous opening and closing movement in the circumferential direction. Due to the reduced transversal dimension of the sipes, such continuous movement causes on the bottom of the sipes a concentration of force that is variable over time. Due to phenomena of mechanical fatigue, this concentration of force can lead to the formation of microlacerations on the portion of block arranged in a radially inner position with respect to the sipe. Such microlacerations can compromise the structural integrity of the tread band and, consequently, the quality of the tyre.

The Applicant believes that in order to reduce the risk of formation of the aforementioned microlacerations while maintaining at the same time the functionality of the sipes in terms of traction, acceleration, carrying away water and trapping of snow, it would be appropriate to considerably widen the entire bottom portion of the sipes, so as to reduce in an equally considerably way the fatigue force that is concentrated in said bottom portion.

The Applicant, however, has observed that such a widening could result in problems during the extraction of the tyre from the mould at the end of the vulcanisation process. In particular, such widening could cause, during the extraction of the tyre from the mould, an excessive deformation of the two block portions circumferentially adjacent to the sipe, with the risk of generating tears or permanent deformations in the blocks and, consequently, compromising the correct behaviour of the tyre during rolling.

The Applicant believes that it is possible to reduce the risk of formation of the aforementioned microlacerations, while reducing at the same time the deformation of the blocks during the extraction of the tyre from the mould within acceptable limits, providing for a non-constant widening of the entire bottom portion of the sipes.

The Applicant has indeed observed that, during rolling of the tyre, the opening and closing movement of the sipe in the circumferential direction is more accentuated at certain areas of the block and less accentuated at other areas of the block. This is due to the different volume of elastomeric material that needs to be moved, also depending on the axial position of the blocks in the tread band.

In general, the Applicant has observed that the opening and closing movement of the sipe in the circumferential direction is more accentuated close to the opposite axial end portions del block and less accentuated at the areas of the block arranged between said opposite axial end portions. In particular, the Applicant has observed that, with reference to the blocks arranged at the axially outermost annular portions of the tread band, the opening and closing movement of the sipe in the circumferential direction is more accentuated close to the axially outermost face of the block and less accentuated at any axially innermost area of the block, whereas with reference to the blocks arranged at the central annular portion of the tread band, the opening and closing movement of the sipe in the circumferential direction is more accentuated close to the axially outermost face and close to the axially innermost face of the block and less accentuated at the central area of the block.

Therefore, according to the Applicant, the bottom portion of the sipe is subjected to a concentration of fatigue force that, at the areas of the block arranged between the opposite axial end portions of the block, is lower than that at the opposite axial end portions of the block. Consequently, the Applicant believes that it is possible to carry out, in the part of the bottom portion of the sipe arranged at the areas of the block arranged between the aforementioned opposite axial end portions of the block, a widening that is smaller than that provided for at the opposite axial end portions of the block, without this resulting in a greater risk of formation of microlacerations in the block. Such a smaller widening indeed causes a reduction of the overall stress which the block is subjected to during the extraction of the tyre from the mould.

The present invention therefore relates to a tyre for vehicle wheels comprising a tread band having a plurality of blocks, wherein at least some of said blocks comprise at least one sipe extending from an axially outer portion of the block up to an axially inner portion of the block and from a radially outer face of the block towards a radially inner portion of the block.

Preferably, said at least one sipe extends from the axially outer portion of the block to the axially inner portion of the block along a predetermined trajectory and comprises, in any cross-section perpendicular to said predetermined trajectory, a main portion having a first radial dimension and a first transversal dimension and, in a radially inner position with respect to said main portion and adjacent to the radially inner portion of the block, a bottom portion having a second radial dimension smaller than said first radial dimension and a second transversal dimension greater than said first transversal dimension.

Preferably, the second transversal dimension measured in a first cross-section of the sipe taken at at least one of said axially outer portion of the block and said axially inner portion of the block is greater than the second transversal dimension measured in a second cross-section taken at a portion of the block axially arranged between said axially outer portion of the block and said axially inner portion of the block.

The tyre of the invention thus comprises sipes whose entire bottom portion is widened, so as to reduce the risk of formation of microlacerations in the blocks due to the continuous movement thereof during the rolling of the tyre. Such a widening is, however, smaller at the areas of the block arranged between the opposite axial end portions of the block, i.e. the areas where the movement of the blocks during the rolling of the tyre is less accentuated, so as to reduce the overall deformation of the blocks during the extraction of the tyre from the mould. The Applicant believes that since such advantageous effects are achieved by intervening only on the bottom portion of the sipes, it is possible to suitably design the remaining part of the sipes of the tyre of the invention to ensure the desired characteristics of traction, acceleration, driveability and controllability, both on dry road surfaces and on wet or snow-covered road surfaces.

Preferably, the sipe extends from an axially outer face of the block up to an axially inner face of the block.

Preferably, said second transversal dimension varies with continuity between said first cross-section of the sipe and said second cross-section of the sipe.

In preferred embodiments of the tyre, said at least one sipe comprises an axially outer portion, an axially inner portion and a central portion defined between said axially outer portion and said axially inner portion, wherein said first cross-section of the sipe is taken at said axially outer portion and said second cross-section of the sipe is taken at said central portion.

Preferably, the second transversal dimension measured in said second cross-section of the sipe is smaller than, or equal to, the second transversal dimension measured in a third cross-section of the sipe taken at said axially inner portion.

Preferably, the second transversal dimension measured in said first cross-section of the sipe is greater than, or equal to, the second transversal dimension measured in said third cross-section of the sipe. According to the Applicant such a sipe geometry is particularly effective in the blocks arranged at the axially outermost annular portions of the tread band, where during the rolling of the tyre the area close to the axially outer face of the blocks is subjected to a greater deformation with respect to the area close to the axially inner face of the blocks.

In preferred embodiments of the tyre, the ratio between the second transversal dimension measured in said second cross-section of the sipe and the second transversal dimension measured in said first cross-section of the sipe is comprised between about 0.15 and about 0.9, preferably between about 0.5 and 0.8, the extreme values being included.

Preferably, said at least one sipe comprises, in said central portion, at least one area in which said predetermined trajectory is not rectilinear. Such a variation of trajectory defines a constraint or embedding in the block that prevents the mutual sliding of the two circumferentially adjacent block portions separated by the sipe, in such a way obtaining an improvement of the performance in terms of lateral grip.

The Applicant believes that the aforementioned embeddings make the extraction of the tyre from the mould more problematic. Therefore, the Applicant considers it advantageous that the narrowing of the bottom portion of the sipe is located right at the portion of the sipe in which the aforementioned embeddings are provided. Moreover, the Applicant considers that, right because of the aforementioned embeddings, in the portion of sipe in which such embeddings are provided the continuous opening and closing movement of the sipes is attenuated. Therefore, the narrowing of the bottom portion of the sipe at the aforementioned embeddings does not result in a greater increase in the risk of formation of the aforementioned microlacerations.

Preferably, said bottom portion comprises, in any cross-section of the sipe, a radially inner surface belonging to a circumference having a first radius of curvature, wherein the first radius of curvature measured in said first cross-section of the sipe is greater than the first radius of curvature measured in said second cross-section of the sipe.

More preferably, said first radius of curvature varies with continuity between said first cross-section of the sipe and said second cross-section of the sipe.

In preferred embodiments of the tyre, the first radius of curvature measured in said second cross-section of the sipe is smaller than, or equal to, the first radius of curvature measured in said third cross-section of the sipe.

Preferably, the first radius of curvature measured in said first cross-section of the sipe is greater than, or equal to, the first radius of curvature measured in said third cross-section of the sipe.

In preferred embodiments of the tyre, the ratio between the first radius of curvature measured in said second cross-section of the sipe and the first radius of curvature measured in said first cross-section of the sipe is comprised between about 0.1 and about 0.8, preferably between about 0.2 and about 0.5, the extreme values being included.

Preferably, said bottom portion comprises, in any cross-section perpendicular to said predetermined trajectory, opposite radially outer joining surfaces which join said bottom portion to said main portion of said at least one sipe through a second radius of curvature, wherein the second radius of curvature measured in said first cross-section of the sipe is smaller than, or equal to, the second radius of curvature measured in said second cross-section of the sipe.

Preferably, said second transversal dimension varies with continuity between said first cross-section of the sipe and said second cross-section of the sipe.

In preferred embodiments of the tyre, the second radius of curvature measured in said second cross-section of the sipe is greater than, or equal to, the second radius of curvature measured in said third cross-section of the sipe.

In preferred embodiments of the tyre, the ratio between the second radius of curvature measured in said second cross-section of the sipe and the second radius of curvature measured in said first cross-section of the sipe is comprised between about 1 and about 1.6, the extreme values being included, preferably between about 1 and about 1.5, the extreme values being included.

In some embodiments of the invention, said tread band comprises a central annular portion astride of an equatorial plane of the tyre and two annular shoulder portions arranged on axially opposite sides with respect to the central annular portion, the central annular portion being separated from each annular shoulder portion by a respective circumferential groove, wherein said at least one sipe is provided only on blocks of said central annular portion. The Applicant believes that such a tread band pattern is particularly suitable for being used in front tyres. According to the Applicant, indeed, in such tyres the central annular portion of the tread band is more stressed during the rolling with respect to the annular shoulder portions and it is therefore advantageous to provide for a variable widening of the bottom portion of the sipes of only the blocks of the aforementioned central annular portion.

In other embodiments of the invention, said tread band comprises a central annular portion astride of an equatorial plane of the tyre and two annular shoulder portions arranged on axially opposite sides with respect to the central annular portion, the central annular portion being separated from each annular shoulder portion by a respective circumferential groove, wherein said at least one sipe is provided both on blocks of said central annular portion and on blocks of said annular shoulder portions. The Applicant believes that such a tread band pattern is particularly suitable for being used in rear tyres. According to the Applicant, indeed, in such tyres the annular shoulder portions of the tread band are greatly stressed during rolling and it is therefore advantageous to provide for a variable widening of the bottom portion of the sipes not only in the blocks of the central annular portion but also in the blocks of the aforementioned annular shoulder portions.

BRIEF DESCRIPTION OF THE DRAWINGS

Further characteristics and advantages of the tyre of the present invention will become clearer from the following detailed description of some preferred embodiments thereof, made with reference to the attached drawings. In such drawings:

FIG. 5 is a schematic view of a cross section of the sipe of FIG. 3, taken in the section plane A-A;

FIG. 6 is a schematic view of a cross section of the sipe of FIG. 3, taken in the section plane B-B;

DETAILED DESCRIPTION OF EMBODIMENTS

Figure 1:
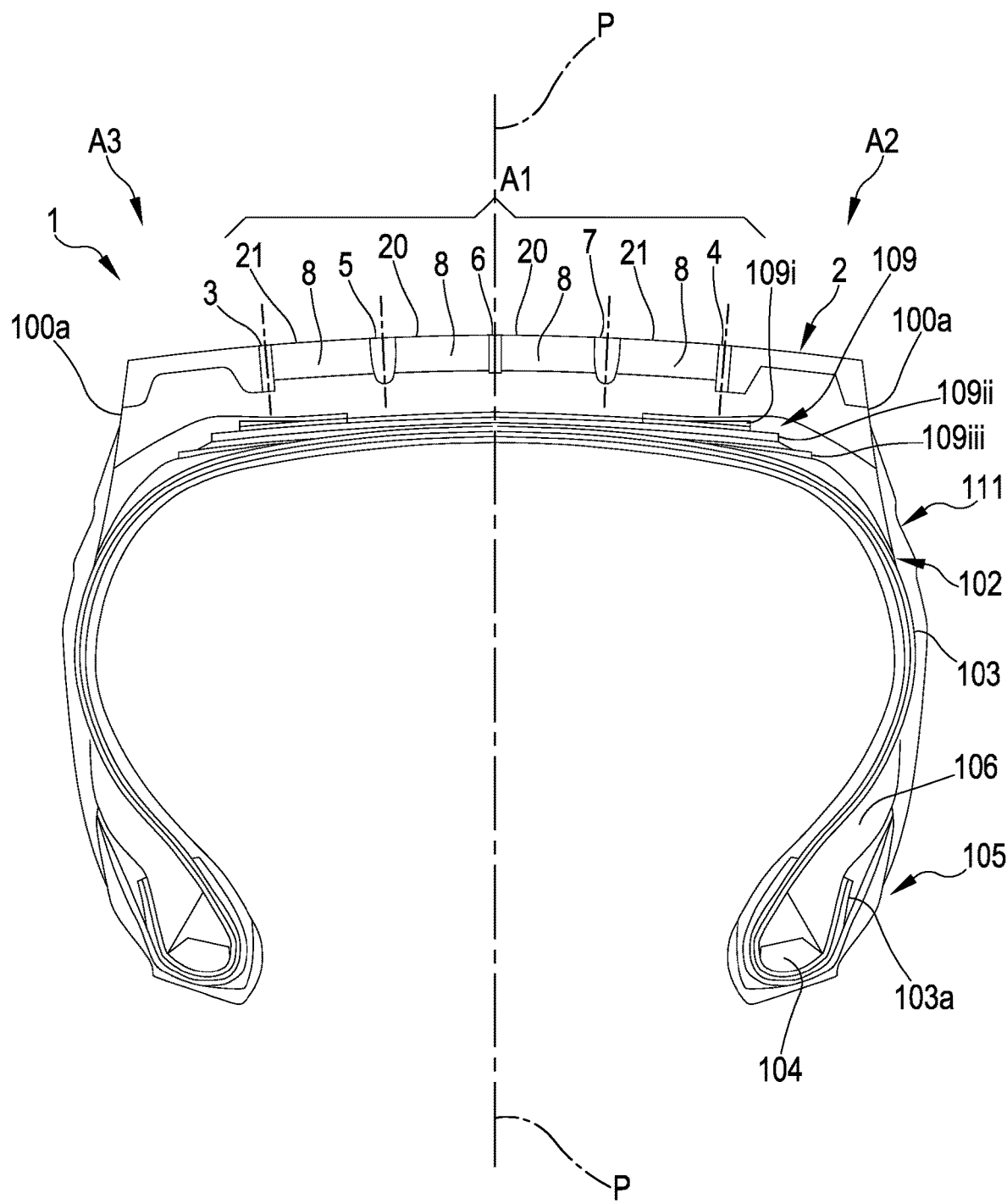
FIG. 1 is a schematic partial half cross-section view of a tyre according to an embodiment of the present invention.

In FIG. 1, reference numeral 1 is used to wholly indicate a tyre for vehicle wheels according to the present invention, in particular a tyre intended for driving wheels or steering wheels of a heavy vehicle.

The tyre 1 comprises a carcass structure 102, including at least one carcass ply 103 (in the illustrated example two plies) formed by typically metallic reinforcing cords incorporated in an elastomeric matrix.

The carcass ply 103 has opposite end edges 103a engaged with respective bead cores 104. The latter are arranged in the areas 105 of the tyre 1 usually identified by the name "beads". An elastomeric filler 106 is applied on the outer perimeter edge of the bead cores 104. The elastomeric filler 106 occupies the space defined between the carcass ply 103 and the respective end edge 103a of the carcass ply 103. The bead cores 104 keep the tyre 1 properly fixed to an anchoring seat specifically provided in the rim of the wheel, thus preventing the bead 105 coming out from such a seat during use.

Specific reinforcing structures (not illustrated) having the function of improving the transmission of torque to the tyre 1 can be provided at the beads 105.

A belt structure 109 is associated in a radially outer position with respect to the carcass structure 102. The belt structure 109 preferably comprises many belt layers (in the specific example illustrated three layers 109i, 109ii, 109iii are shown) arranged radially one on top of the other and including typically metallic reinforcing cords having a crossed over orientation and/or substantially parallel to the direction of circumferential development of the tyre 1.

A tread band 2 made of elastomeric material is applied in a radially outer position with respect to the belt structure 109.

Respective sidewalls 111 made of elastomeric material are also applied on the side surfaces of the carcass structure 102, each sidewall 111 extending from one of the opposite side edges 100a of the tread band 2 up to the respective annular anchoring structure 104 to the beads 105.

Figure 2:
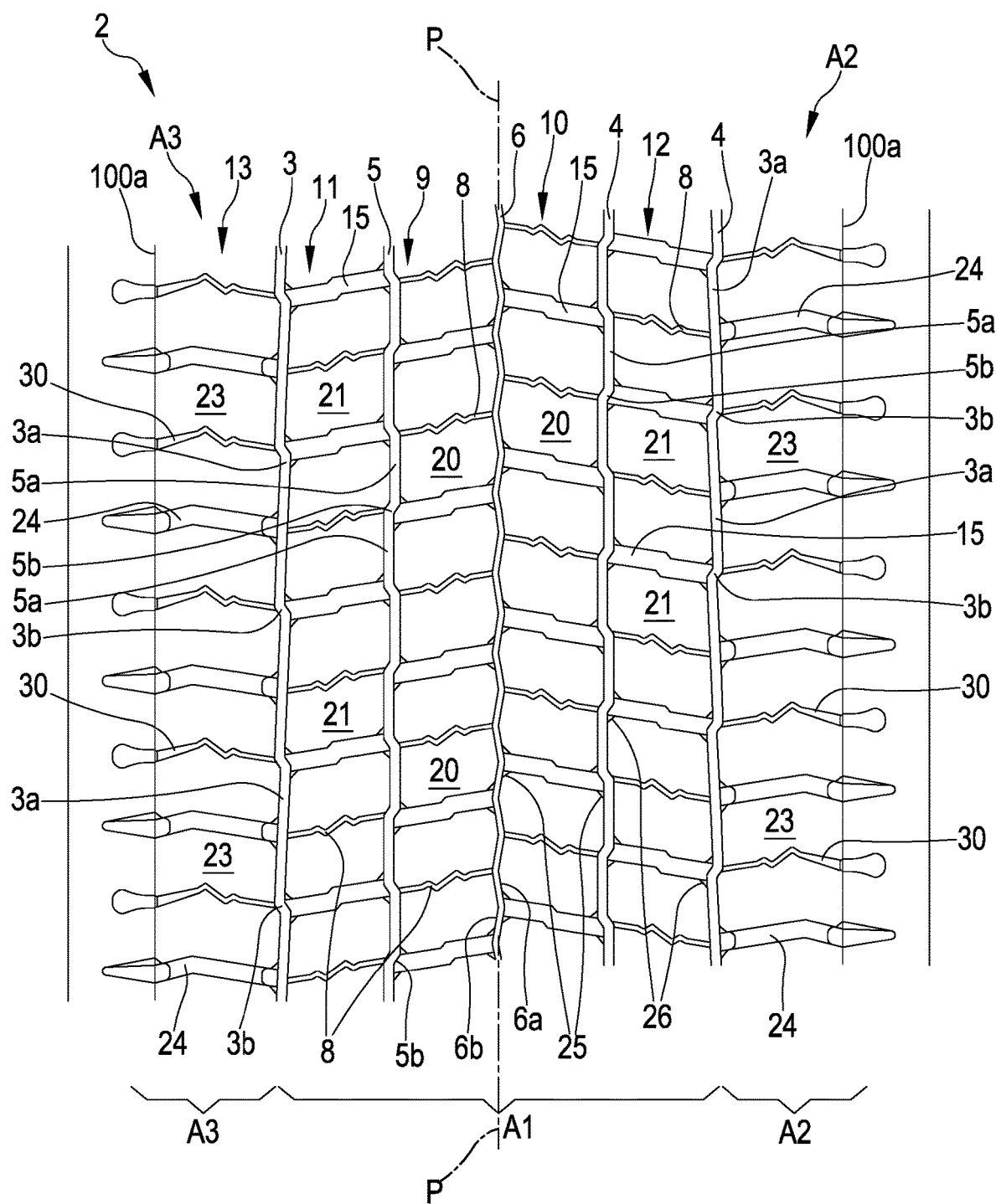
FIG. 2 shows a plan development of a portion of the tread band of the tyre of FIG. 1.

With reference to the exemplifying embodiment illustrated in FIGS. 1-2, the tread band 2 comprises a central annular portion A1 and two annular shoulder portions A2, A3. The central annular portion A1, arranged astride of the equatorial plane P, is separated from the annular shoulder portions A2, A3 by two circumferential grooves 3, 4.

The circumferential grooves 3, 4 are mainly provided to ensure drainage of water from the ground-contacting area, in particular when the tyre is traveling in a straight line. For this purpose, the circumferential grooves 3, 4 can have a width greater than or equal to about 2 mm. Preferably, the circumferential grooves 3, 4 can have a width greater than or equal to about 3 mm, in any case smaller than or equal to about 20 mm, preferably smaller than or equal to about 15 mm, for example equal to about 7 mm.

Preferably, the circumferential grooves 3, 4 can have a depth greater than or equal to about 10 mm, preferably greater than or equal to about 15 mm, in any case smaller than or equal to about 30 mm, for example equal to about 18 mm. The choice of providing the circumferential grooves 3, 4 with a great depth makes it possible to obtain good drainage characteristics.

More preferably, the circumferential grooves 3, 4 have a non-rectilinear extension circumferentially, that is they have deviated portions. In other words, the circumferential grooves 3, 4 preferably extend along the entire circumferential extension of the tyre 1 according to a path forming a broken line in which there are first circumferential parts 3a substantially parallel to the equatorial plane P and second circumferential parts 3b inclined with respect to the equatorial plane P. The second circumferential parts 3b extend so as to join the aforementioned first circumferential parts 3a. In this way the traction of the tread band 2 is advantageously increased in the direction of forward motion of the tyre 1.

Moving axially towards the equatorial plane P, the tread band 2 has two further circumferential grooves 5, 7 arranged inside the two circumferential grooves 3, 4.

The circumferential grooves 5, 7 can have a width greater than the circumferential grooves 3, 4. Preferably, the circumferential grooves 5, 7 have a width greater than or equal to about 2 mm. Preferably, the circumferential grooves 5, 7 can have a width greater than or equal to about 3 mm, in any case smaller than about 25 mm, for example equal to about 12 mm.

Preferably, the circumferential grooves 5, 7 can have a depth greater than or equal to about 10 mm, preferably greater than or equal to about 15, in any case smaller than about 30 mm, for example equal to about 18 mm. The choice of providing the circumferential grooves 5, 7 with a great depth and width makes it possible to obtain good drainage characteristics.

More preferably, the circumferential grooves 5, 7 do not have a rectilinear extension circumferentially, that is they have deviated portions. In other words, the circumferential grooves 5, 7 preferably extend along the entire circumferential development of the tyre 1 according to a path forming a broken line in which there are first circumferential parts 5a substantially parallel to the equatorial plane and second circumferential parts 5b inclined with respect to the equatorial plane and joining the aforementioned first circumferential parts 5a. In this way, the traction of the tread band 2 is advantageously increased in the direction of forward motion of the tyre 1.

A further circumferential groove 6 is preferably arranged astride of the equatorial plane P of the tyre. The circumferential groove 6 has a substantially "zig-zag" extension comprising a plurality of inclined first circumferential parts 6a alternating with a plurality of second circumferential parts 6b which are counter-inclined with respect to the inclined first parts 6a.

Preferably, the maximum depth of the tread band 2 (and therefore the maximum depth of the circumferential grooves 3, 4, 5, 6, 7) is comprised between about 10 mm and about 25 mm, such a depth being more preferably equal to about 22 mm.

The central annular portion A1 is designed so as to maintain a low rolling resistance and a regularity of wear for the entire useful life of the tyre 1.

In detail, in the embodiment shown in FIGS. 1 and 2, the central annular portion A1 has four circumferential rows 9, 10, 11, 12 of blocks, two circumferential rows 9, 10 of central blocks 20 and two circumferential rows 11, 12 of side blocks 21.

The circumferential rows 11, 12 of side blocks 21 are arranged outside of the circumferential rows 9, 10 of central blocks 20, so that the circumferential row 11 of side blocks 21 is separated from the circumferential row 9 of central blocks 20 by the circumferential groove 5 and the circumferential row 12 of side blocks 21 is separated from the circumferential row 10 of central blocks 20 by the circumferential groove 7.

In the embodiment of FIGS. 1, 2, the circumferential row 11 of side blocks 21 is axially arranged between the circumferential groove 3 and the circumferential groove 5, whereas the circumferential row 12 of side blocks 21 is axially arranged between the circumferential groove 4 and the circumferential groove 7.

In the embodiment of FIGS. 1 and 2, the circumferential row 9 of central blocks 20 is thus axially arranged between the circumferential groove 5 and the circumferential groove 6. Similarly, the circumferential row 10 of central blocks 20 is axially arranged between the circumferential groove 7 and the circumferential groove 6.

Each block 20, 21 is separated from the circumferentially consecutive block 20, 21 by a transversal groove 15.

Each block 20, 21 comprises a sipe 8 that extends from an axially outer portion of the block 20, 21 up to an axially inner portion of the same block 20, 21 and from a radially outer face of the block 20, 21 towards a radially inner portion thereof.

In the example of FIG. 2, the sipe 8 extends from an axially outer face of the block 20, 21 up to an axially inner face of the same block 20, 21.

The sipes 8 of each circumferential row 9, 10 of central blocks 20 and of each circumferential row 11, 12 of side blocks 21 are not aligned with the sipes 8 of the circumferential rows of axially adjacent blocks, that is they are circumferentially offset with respect to the latter.

The sipes 8 extend from the axially outer face of the block 20, 21 up to the axially inner face of the same block 20, 21 along a trajectory that may or may not be rectilinear.

Preferably, such a trajectory is inclined with respect to the equatorial plane P of the tyre 1 by an angle different from 90°.

Preferably, the sipes 8 of the circumferential rows 9, 10 have opposite inclination to each other with respect to the equatorial plane P. Similarly, the sipes 8 of the circumferential rows 11, 12 have opposite inclination to each other with respect to the equatorial plane P.

In addition, the sipes 8 of the circumferential row 9 of central blocks 20 have substantially the same inclination with respect to the equatorial plane P of the sipes 8 of the circumferential row 11 of side blocks 21. Similarly, the sipes 8 of the circumferential row 10 of central blocks 20 have substantially the same inclination with respect to the equatorial plane P of the sipes 8 of the circumferential row 12 of side blocks 21.

In detail, the angle of inclination of the sipes 8 of the circumferential rows 9, 10, 11, 12 of the tread band 2 of FIG. 2 with respect to the equatorial plane P of the tyre 1 is comprised in the range between about 90° and about 140°, preferably between about 70° and about 110° (in absolute value).

In the case in which the sipes 8 do not have a rectilinear trajectory, like in the specific example illustrated in FIG. 2, the inclination of such a trajectory is defined considering the inclination of the line that interpolates all of the points of the trajectory.

In the example of tread band 2 illustrated in FIG. 2, the sipes 8 of the circumferential row 9, 10 of central blocks 20 and of the axially adjacent circumferential row 11, 12 of side blocks 21 preferably have an identical shape.

More preferably, the sipes 8 of the circumferential row 9 of central blocks 20 and of the axially adjacent circumferential row 11 of side blocks 21 have, respectively, a shape that mirrors, with respect to the equatorial plane P, the transversal sipes 8 of the circumferential row 10 of central blocks 20 and of the circumferential row 12 of side blocks 21.

In a particularly preferred embodiment of a tyre of the present invention of the winter type, such as the one illustrated in FIG. 2, the volume occupied by the blocks 20, 21, or volume of the rubber, in the central annular portion A1 of the tread band 2, in a portion of the tread band 2 having a length equal to the pitch of the tread pattern and a width equal to the axial extension of the tread band 2, is comprised between about 60% and about 95% of the overall volume of such a central annular portion A1 (total volume). In the illustrated example, the ratio between volume of the rubber and total volume is equal to about 76%.

Preferably, some of the central blocks 20 of the central annular portion A1 of the tread band 2 of the example of FIG. 2 have a bevelled edge 25 at the circumferential groove 6 and, preferably, at the circumferential groove 5, 7.

Preferably, the side blocks 21 of the central annular portion A1 preferably have a bevelled edge 26 at the circumferential groove 5, 7 and, preferably, at the circumferential groove 3, 4.

Advantageously, in this way the number of edges that can trigger phenomena of irregular wear and noise, by means of their mobility, is suitably reduced.

Preferably, the tyre 1 further comprises, at each of the two annular shoulder portions A2, A3, a plurality of blocks 23 arranged along a respective circumferential row 13, 14 comprised between the respective circumferential groove 3, 4 and the respective axial end portion 100a of the tread band 2.

Each block 23 is separated from the circumferentially consecutive block 23 by a transversal groove 24.

The blocks 23 of one circumferential row 14 are preferably arranged circumferentially offset with respect to the blocks of the other circumferential row 13.

The transversal grooves 24 have a reduction in depth at their axially innermost portion so as to identify a double-step shape. The choice of keeping the depth of the transversal grooves 24 low in the axially innermost portion makes it possible to ensure greater strength with respect to lateral and torsional stresses.

Each block 23 comprises a sipe 30 that extends from an axially outer face of the block 23 up to an axially inner face of the same block 23 and from a radially outer face of the block 23 towards a radially inner portion thereof.

The sipes 30 of the circumferential row 13, 14 are not aligned with the sipes 8 of the axially adjacent circumferential row 11, 12, that is they are circumferentially offset with respect to the latter.

The axial extension of the blocks 23, of the sipes 30 and of the transversal grooves 24 is preferably greater than that of the blocks 20, 21, of the sipes 8 and of the transversal grooves 15, respectively, of the central annular portion A1 of the tread band 2.

The sipes 30 of the circumferential rows 13, 14 extend from the axially outer face of the block 23 up to the axially inner face of the same block 23 along a trajectory that may or may not be rectilinear.

Preferably, such a trajectory is inclined with respect to the equatorial plane P of the tyre 1 by an angle different from 90°.

Preferably, the sipes 30 of the circumferential rows 13, 14 have the same inclination with respect to the equatorial plane P.

In detail, the angle of inclination of the sipes 30 of the circumferential rows 13, 14 with respect to the equatorial plane P of the tyre 1 is comprised in the range between about 90° and about 140°, preferably between about 70° and about 110° (in absolute value).

In the case in which the sipes 30 do not have a rectilinear trajectory, like in the specific example illustrated in FIG. 2, the inclination of such a trajectory is defined considering the inclination of the line that interpolates all of the points of the trajectory.

In the tread pattern of FIG. 2, the sipes 30 in the blocks 23 of the annular shoulder portions A2, A3, have an identic and mirroring shape with respect to the equatorial plane P.

Figure 3:
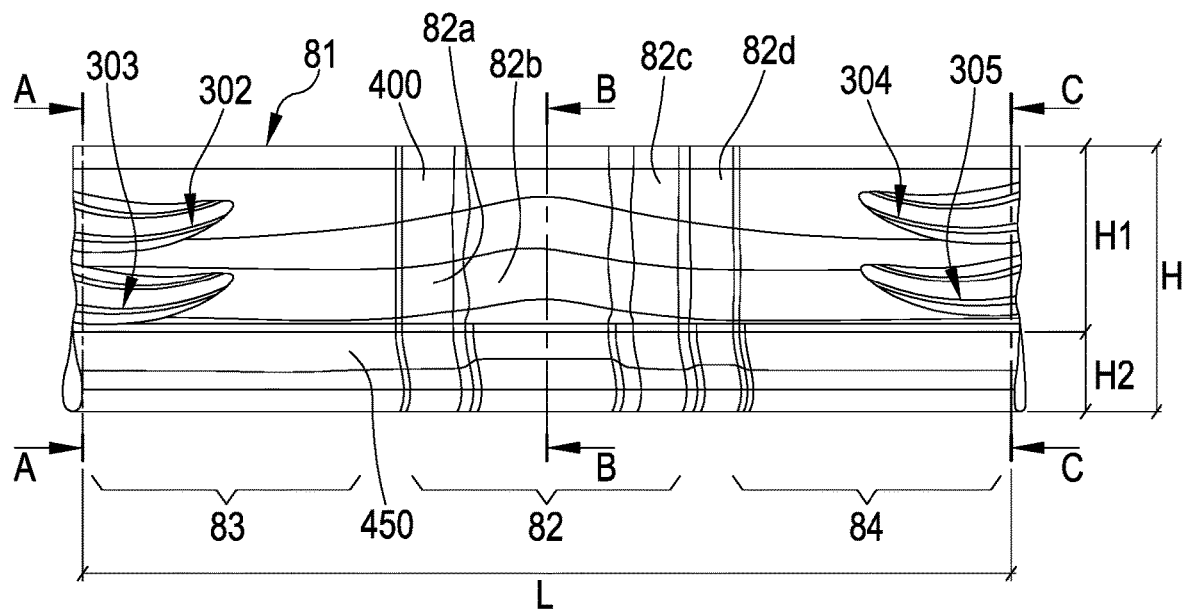
FIG. 3 is a schematic front view of an embodiment of a sipe used in the tyre of FIG. 1.
Figure 4:
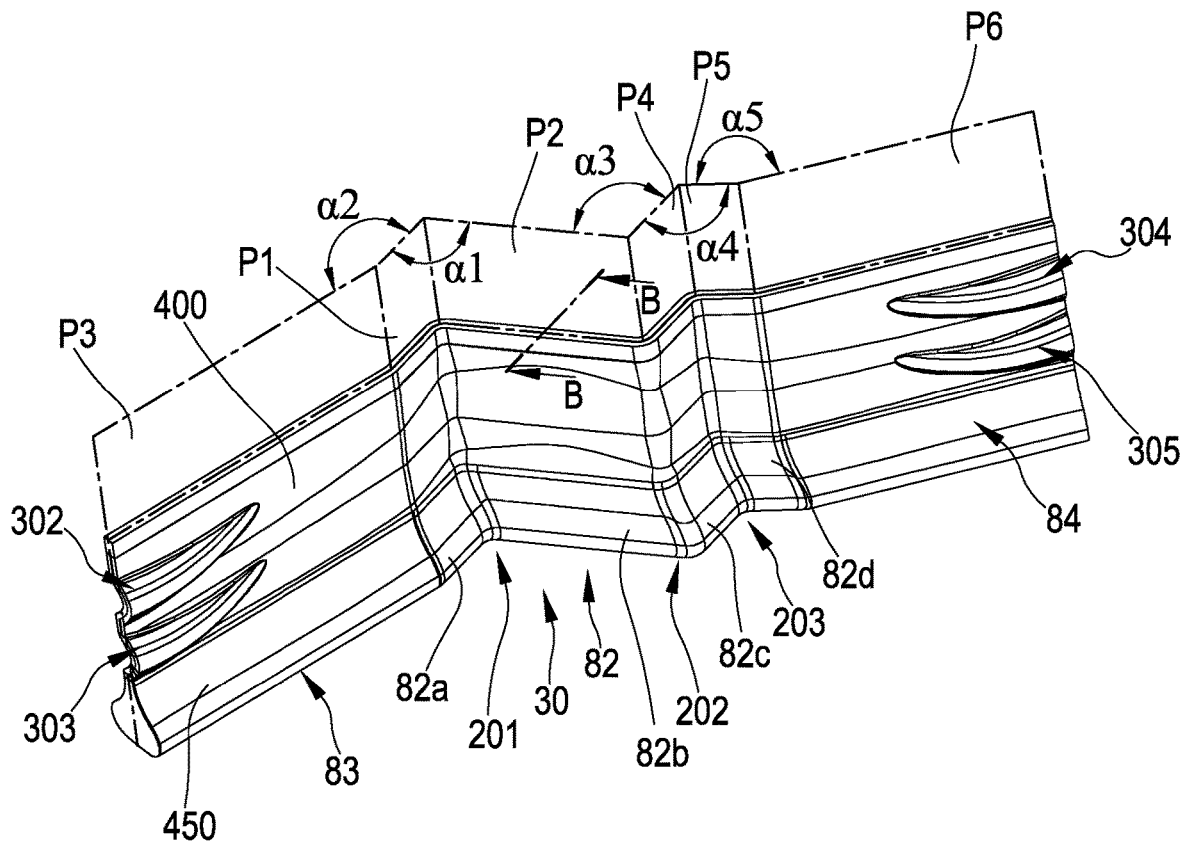
FIG. 4 is a schematic perspective view of the sipe of FIG. 3.

FIGS. 3 and 4 show a preferred embodiment of the sipe 8 and/or of the sipe 30 used in the tread band 2 of the tyre 1 described above.

In the following description, for the sake of ease of description, "sipe" indicates and represents both the sipe obtained on the tread pattern and the portion of the mould adapted to obtain the latter. The surfaces of the aforementioned portion of mould are indeed perfectly matched to the surfaces of the sipe obtained.

For the sake of simplicity of description and for easy reading, throughout the present description the shape of the sipe will be described with explicit reference to the sipes 30 of the circumferential row 13, being understood that what is stated is also valid for the sipes 30 of the circumferential row 14.

In embodiments that are not illustrated, the sipes 8 of the central annular portion A1 of the tread band 2 have an identical shape to that of the sipes 30 of the annular shoulder portions A2, A3.

In further embodiments that are not illustrated, the sipes described below are provided only in the central annular portion A1 of the tread band 2 and not also in the shoulder portions A2, A3.

With particular reference to FIG. 3, the sipe 30 comprises a main surface 81 having a predetermined radial extension (or depth) H and a predetermined axial extension (or length) L. Preferably, the depth H is comprised between about 20% and 100% of the maximum depth of the tread band 2, whereas the length L is preferably equal to that of the blocks 23.

Preferably, the depth H is greater than or equal to about 7 mm.

Preferably, the depth H is smaller than or equal to about 25 mm.

In the preferred embodiments of the invention, the depth H is comprised between about 7 mm and about 25 mm, the extreme values being included, for example equal to about 13 mm.

In a preferred embodiment illustrated in FIG. 4, the main surface 81 has an axially outer portion 83, an axially inner portion 84 and a central portion 82 axially arranged between the axially outer portion 83 and the axially inner portion 84 and having a non-rectilinear axial extension.

The sipe 30 comprises, in any cross section thereof, a main portion 400 and a bottom portion 450. The bottom portion 450 extends in a radially inner position with respect to the main portion 400.

The main portion 400 of the sipe 30 can be suitably designed to ensure desired characteristics of traction, acceleration, driveability and controllability, both on dry road surfaces and on wet or snow-covered road surfaces.

In the preferred embodiment illustrated in FIGS. 3 and 4, the main portion 400 comprises, at the central portion 82 of the sipe 30, an area having three deformations 201, 202, 203 that follow one another in the axial direction and that define as many deviations of the trajectory of the sipe 30 from a substantially rectilinear extension. The three deformations 201, 202, 203 define in the block 23 respective portions of mutual embedding or constraint in the axial direction, obstructing the axial sliding between the two portions of block 23 separated by the sipe 30.

The three deformations 201, 202, 203, extending for the entire radial extension of the central portion 82 of the sipe 30, also extend in the bottom portion 450 of the sipe 30, as shown in FIG. 4.

Preferably, the deformation 201 is defined by a first 82a and a second 82b part of central portion 82 that lie on respective lying planes P1, P2 forming a predetermined convex angle $\alpha 1$ between them. Preferably, angle $\alpha 1$ is greater than or equal to about 65°. Preferably, angle $\alpha 1$ is smaller than or equal to about 145°. In the preferred embodiment, angle $\alpha 1$ is comprised between about 65° and about 145°, the extreme values being included, more preferably it is equal to about 112°.

The lying plane P1 of the first part 82a of central portion 82, which is in an axially outermost position with respect to the other parts of central portion 82, forms a convex angle $\alpha 2$ with a lying plane P3 of the axially outer portion 83 of the main surface 81. Preferably, angle $\alpha 2$ is greater than or equal to about 130°. Preferably, angle $\alpha 2$ is smaller than or equal to about 175°. In the preferred embodiment, angle $\alpha 2$ is preferably comprised between about 130° and about 185°, the extreme values being included, more preferably it is equal to about 165°.

Preferably, the deformation 202 is defined by a third part 82c of central portion 82 and by the second part 82b of central portion 82 that lie on respective lying planes P4, P2 forming a predetermined convex angle $\alpha 3$ between them. Preferably, angle $\alpha 3$ is greater than or equal to about 65°. Preferably, angle $\alpha 3$ is smaller than or equal to about 145°. In the preferred embodiment, angle $\alpha 3$ is preferably comprised between about 65° and about 145°, the extreme values being included, more preferably it is equal to about 112°.

Preferably, the deformation 203 is defined by a fourth part 82d of central portion 82 and by the third part 82c of central portion 82 that lie on respective lying planes P5, P4 forming a predetermined convex angle $\alpha 4$ between them. Preferably, angle $\alpha 4$ is greater than or equal to about 65°. Preferably, angle $\alpha 4$ is smaller than or equal to about 145°. In the preferred embodiment, angle $\alpha 4$ is preferably comprised between about 65° and about 145°, the extreme values being included, more preferably it is equal to about 122°.

The lying plane P5 of the fourth part 82d of central portion 82, which is in an axially innermost position with respect to the other parts of central portion 82, forms a convex angle $\alpha 5$ with a lying plane P6 of the axially inner portion 84 of the main surface 81. Preferably, angle $\alpha 5$ is greater than or equal to about 130°. Preferably, angle $\alpha 5$ is smaller than or equal to about 175°. In the preferred embodiment, angle $\alpha 5$ is preferably comprised between about 130° and about 185°, the extreme values being included, more preferably it is equal to about 165°.

The main surface 81 preferably has four further deformations 302, 303, 304, 305 arranged in pairs on the axially outer portion 83 and on the axially inner portion 84, respectively, of the main surface 81.

The deformations 302, 303, 304, 305 are arranged only on the main portion 400 of the sipe 30 and do not extend in the bottom portion 450 thereof.

Each pair of deformations 302, 303, 304, 305 extends in a substantially perpendicular direction from the lying plane P3, P6 of the respective portion of main surface 81.

The deformations 302, 303, 304, 305 are configured to define in the block 23 respective portions of mutual embedding in the circumferential direction.

The number of deformations 302, 303, 304, 305 of the main surface 81 of the block 23 can also be different from four, although it is preferable to have a number of deformations comprised between four and ten, in order to improve the aforementioned embedding.

Figure 7:
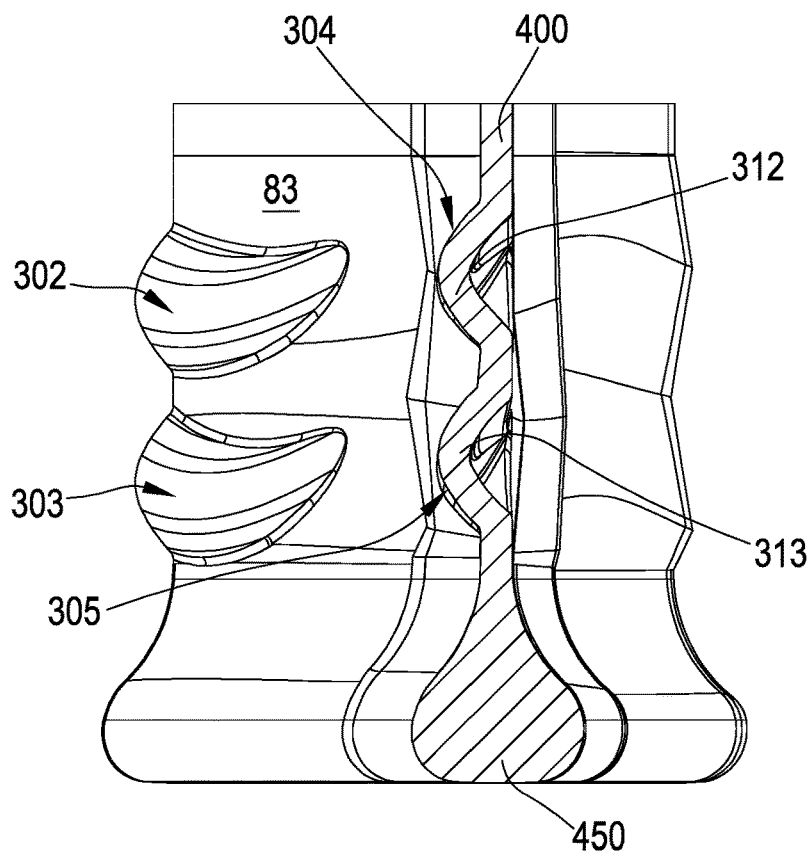
FIG. 7 is a schematic view of a cross section of the sipe of FIG. 3, taken in the section plane C-C.

As illustrated in FIGS. 5 and 7, the deformations 302, 303, 304, 305 are defined, respectively, by a first pair of bent portions 310, 311 arranged side-by-side in the radial direction and by a second pair of bent portions 312, 313 also arranged side-by-side in the radial direction and axially arranged on the opposite side to the bent portions 310, 311 with respect to the central portion 82 of the sipe 30.

Preferably, the bent portions 310, 311, 312, 313 are all of the same shape and of the same size.

The bent portions of the first pair of bent portions 310, 311 extend on a same side of the main portion 400 of the sipe 30. Similarly, the bent portions of the second pair of bent portions 312, 313 extend on the same side of the main portion 400 of the sipe 30, such a side being the same one on which the bent portions of the first pair of bent portions 310, 311 extend.

In an alternative embodiment, not illustrated, of the sipe 30, the bent portions of the first pair of bent portions 312, 313 extend on a side of the main portion 400 opposite to the one on which the bent portions of the second pair of bent portions 310, 311 extend.

The bent portions 310, 311, 312, 313 have a width (that is the distance from the respective lying planes P3, P6) and radial extension progressively decreasing from the axial end of the sipe 30 towards the inside thereof.

The main portion 400 of the sipe 30 has a first radial dimension H1 and a first transversal dimension L1.

Preferably, the first radial dimension H1 is greater than or equal to about 3 mm.

Preferably, the first radial dimension H1 is smaller than or equal to about 20.5 mm.

In the preferred embodiments of the invention, the first radial dimension H1 is comprised between about 3 mm and about 20.5 mm, the extreme values being included, for example equal to about 8.5 mm.

Preferably, the first transversal dimension L1 is greater than or equal to about 0.6 mm.

Preferably, the first transversal dimension L1 is smaller than or equal to about 3 mm.

In the preferred embodiments of the invention, the first transversal dimension L1 is comprised between about 0.6 mm and about 3 mm, the extreme values being included, for example equal to about 0.6 mm.

Preferably, the first radial dimension H1 is substantially constant along the entire axial extension of the sipe 30.

Preferably, the first transversal dimension L1 is substantially constant along the entire axial extension of the sipe 30. The first transversal dimension L1 is also preferably constant along the entire radial extension of the main portion 400 of the sipe 30.

As illustrated in FIG. 6, the main portion 400 has, in a cross section of the sipe 30 taken at the central portion 82 thereof, a deviated shape. Preferably, such a deviated shape is given by three deformations 401, 402, 403, in which each of the three deformations projects substantially perpendicular from the lying plane P2 of the central portion 82 of the sipe 30.

In the embodiment shown in FIG. 6, the deformation 401 is arranged in a radially inner position with respect to the deformation 402, which is in turn arranged in a radially inner position with respect to the deformation 403.

Preferably, the deformation 401 projects on the opposite side of the lying plane P2 with respect to the deformation 402.

Preferably, the deformation 403 projects on the opposite side of the lying plane P2 with respect to the deformation 402 which is adjacent in the inner radial direction.

Preferably, the deformation 401 and the deformation 403 project on the opposite side, with respect to the lying plane P2, of the deformations 302, 303, 304, 305 that extend in the axially inner portion 84 and axially outer portion 83 of the sipe 30.

The deformations 401, 402, 403 that extend in the central portion 82 of the sipe 30 are configured to define in the block 23 respective portions of mutual embedding.

The bottom portion 450 of the sipe 30 has a second radial dimension H2 and a second transversal dimension L2.

The sum of the first radial dimension H1 and second radial dimension H2 taken in any cross-section of the sipe is always equal to the radial extension H of the sipe 30.

Preferably, in any cross-section of the sipe 30 the second radial dimension H2 is smaller than the first radial dimension H1.

Preferably, the second radial dimension H2 is greater than or equal to about 2.5 mm.

Preferably, the second radial dimension H2 is smaller than or equal to about 6 mm.

In the preferred embodiments of the invention, the second radial dimension H2 is comprised between about 2.5 mm and about 6 mm, the extreme values being included, for example equal to about 4.5 mm.

Preferably, the second transversal dimension L2 is greater than or equal to about 1.5 mm.

Preferably, the second transversal dimension L2 is smaller than or equal to about 15 mm.

In the preferred embodiments of the invention, the second transversal dimension L2 is comprised between about 1.5 mm and about 15 mm, the extreme values being included, for example equal to about 3.2 mm.

In the embodiment of FIGS. 3 and 4, the second transversal dimension L2 measured in a cross section of the sipe 30 taken at the axially outer portion 83 of the sipe 30, schematically illustrated in FIG. 5, is greater than the second transversal dimension L2 in a cross section of the sipe 30 measured in any cross-section of the sipe 30 taken at the central portion 82 of the sipe 30.

In the illustrated embodiment, the second transversal dimension L2 measured in a cross section of the sipe 30 taken at the axially outer portion 83 of the sipe is preferably greater than the second transversal dimension L2 measured in a cross section of the sipe 30 taken at the axially inner portion 84 of the sipe 30.

Advantageously, the greater transversal dimension L2 of the axially outer portion 83 of the sipe 30 makes a widened bottom portion 450 in the part of block 30 that is most stressed during the rolling of the tyre 1, reducing the risk of formation of microlacerations in the blocks 30 due to the continuous movement thereof during such rolling. The smaller transversal dimension L2 of the central portion 82 of the block 30 reduces the overall deformation of the blocks 30 during the extraction of the tyre 1 from the mould.

In embodiments that are not illustrated, the second transversal dimension L2 measured in a cross section of the sipe 30 taken at the axially outer portion 83 of the sipe 30 is equal to the second transversal dimension L2 measured in a cross section of the sipe 30 taken at the axially inner portion of the sipe 30.

Preferably, the ratio between the second transversal dimension L2 measured in any cross-section taken at the central portion 82 of the sipe 30 and the second transversal dimension measured in a cross section of the sipe 30 taken at the axially outermost end of the axially outer portion 83 of the sipe 30 is smaller than or equal to about 0.9, more preferably smaller than or equal to about 0.8.

Preferably, the ratio between the second transversal dimension L2 measured in any cross-section of the sipe 30 taken at the central portion 82 of the sipe 30 and the second transversal dimension measured in a cross section of the sipe taken at the axially outermost end of the axially outer portion 83 of the sipe 30 is greater than or equal to about 0.15, more preferably greater than or equal to about 0.5.

In the preferred embodiment, the ratio between the second transversal dimension L2 measured in any cross-section of the sipe 30 taken at the central portion 82 of the sipe 30 and the second transversal dimension measured in a cross section of the sipe 30 taken at the axially outermost end of the axially outer portion 83 of the sipe 30 is comprised between about 0.15 and about 0.9, the extreme values being included, more preferably comprised between about 0.5 and about 0.8, the extreme values being included, for example equal to about 0.7.

Preferably, the ratio between the second transversal dimension L2 measured in a cross section of the sipe 30 taken at the innermost axial end of the axially inner portion 84 of the sipe 30 and the second transversal dimension measured in a cross section of the sipe 30 taken at the axially outermost end of the axially outer portion 83 of the sipe 30 is smaller than or equal to about 1.

Preferably, the ratio between the second transversal dimension L2 measured in a cross section of the sipe 30 taken at the innermost axial end of the axially inner portion 84 of the sipe 30 and the second transversal dimension measured in a cross section of the sipe 30 taken at the axially outermost end of the axially outer portion 83 of the sipe 30 is greater than or equal to about 0.4.

In the preferred embodiment, the ratio between the second transversal dimension L2 measured in a cross section of the sipe 30 taken at the innermost axial end of the axially inner portion 84 of the sipe 30 and the second transversal dimension measured in a cross section of the sipe 30 taken at the axially outermost end of the axially outer portion 83 of the sipe 30 is comprised between about 0.4 and about 1, the extreme values being included, for example equal to about 0.6.

Figure 8:
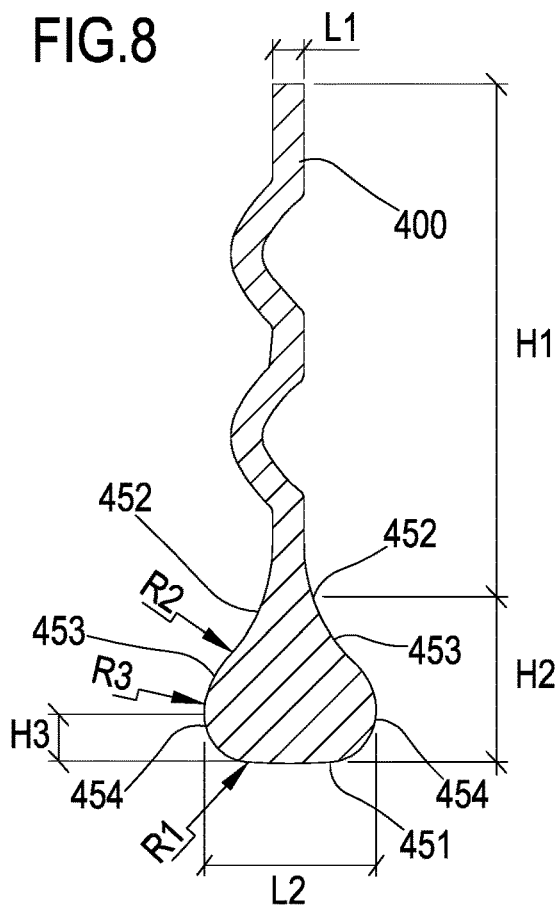
FIG. 8 is a schematic view of the cross section of FIG. 5 with some parts removed to better see other parts.
Figure 9:
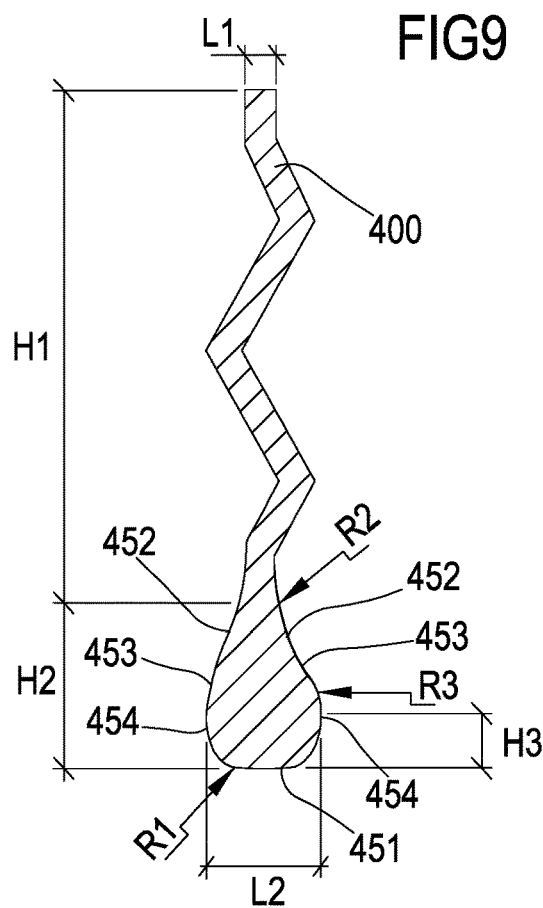
FIG. 9 is a schematic view of the cross section of FIG. 6 with some parts removed to better see other parts.

As illustrated in FIGS. 8 and 9, the bottom portion 450, irrespective of the portion of sipe being referred to, has a lower portion whose radially inner surface 451 belongs to a circumference having a first radius of curvature R1. The radially inner surface 451 is the radially innermost surface of the sipe 30. The aforementioned lower portion of the bottom portion 450 has a third radial dimension H3 smaller than the second radial dimension H2.

The bottom portion 450 also has two opposite and identical radially outer joining surfaces 452 arranged in a radially outer position with respect to the aforementioned lower portion and that join the bottom portion 450 to the main portion 400 of the sipe 30. Both of the radially outer joining surfaces 452 belong to respective circumferences which have the same second radius of curvature R2.

In a position radially arranged between the radially outer joining surfaces 452 and the aforementioned lower portion of the bottom portion 450 there are two opposite and identical side surfaces 453 belonging to respective circumferences which have the same third radius of curvature R3. Between each side surface 453 and the radially inner surface 451 there is a radially inner joining surface 454 which gives continuity of shape to the bottom portion 450.

Between each of the radially outer joining surfaces 452 and the respective side surface 453 there is an inflection point in which the curvature of the outer surface of the bottom portion 450 changes. There is no inflection point between the radially inner surface 451, the radially lower joining surface 454 and the side surfaces 453.

The first radius of curvature R1 of the radially inner surface 451 measured in a cross section of the sipe 30 taken at the axially outermost end of the axially outer portion 83 of the sipe 30 is greater than the first radius of curvature R1 of the radially inner surface 451 measured in any cross-section of the sipe 30 taken at the central portion 82 of the sipe 30.

Advantageously, a wide radius of curvature R1 of the radially inner surface of the bottom portion 450 of the sipe 30 reduces the formation of microlacerations in the block during the rolling of the tyre.

Preferably, the first radius of curvature R1 of the radially inner surface 451 measured in a cross section of the sipe 30 taken at the axially outer portion 83 of the sipe 30 is greater than or equal to the first radius of curvature R1 of the radially inner surface 451 measured in a cross section of the sipe 30 taken at the axially inner portion 84 of the sipe 30.

The first radius of curvature R1 varies with continuity, decreasing, between the axially outer portion 83 of the sipe 30 and the central portion 82 of the sipe 30.

Preferably, the first radius of curvature R1 varies with continuity, increasing or continuing to decrease, between the central portion 82 of the sipe 30 and the axially inner portion of the sipe 30.

Preferably, the ratio between the first radius of curvature R1 measured in any cross-section of the sipe 30 taken at the central portion 82 of the sipe 30 and the first radius of curvature R1 measured in a cross section of the sipe 30 taken at the axially outermost end of the axially outer portion 83 of the sipe 30 is smaller than or equal to about 0.8, more preferably smaller than or equal to about 0.5.

Preferably, the ratio between the first radius of curvature R1 measured in any cross-section of the sipe 30 taken at the central portion 82 of the sipe 30 and the first radius of curvature R1 measured in a cross section of the sipe 30 at the axially outermost end of the axially outer portion 83 of the sipe 30 is greater than or equal to about 0.1, more preferably greater than or equal to about 0.2.

In the preferred embodiment, the ratio between the first radius of curvature R1 measured in any cross-section of the sipe 30 taken at the central portion 82 of the sipe 30 and the first radius of curvature R1 measured in a cross section of the sipe 30 taken at the axially outermost end of the axially outer portion 83 of the sipe is comprised between about 0.1 and about 0.8, the extreme values being included, more preferably between about 0.2 and about 0.5, the extreme values being included, for example equal to about 0.4.

Preferably, the ratio between the first radius of curvature R1 measured in a cross section of the sipe 30 taken at the axially inner portion 84 of the sipe 30 and the first radius of curvature R1 measured in a cross section of the sipe 30 taken at the axially outermost end of the axially outer portion 83 of the sipe is smaller than or equal to about 1.

Preferably, the ratio between the first radius of curvature R1 measured in a cross section of the sipe 30 taken at the axially inner portion 84 of the sipe 30 and the first radius of curvature R1 measured in a cross section of the sipe 30 taken at the axially outermost end of the axially outer portion 83 of the sipe is greater than or equal to about 0.4.

In the preferred embodiment, the ratio between the first radius of curvature R1 measured in a cross section of the sipe 30 taken at the axially inner portion 84 of the sipe 30 and the first radius of curvature R1 measured in a cross section of the sipe 30 taken at the axially outermost end of the axially outer portion 83 of the sipe is comprised between about 0.4 and about 1, the extreme values being included, for example equal to about 0.5.

The second radius of curvature R2 measured in a cross section of the sipe 30 taken at the axially outer portion 83 of the sipe 30 is smaller than, or equal to, the second radius of curvature R2 measured in any cross-section of the sipe 30 taken at the central portion 82 of the sipe 30.

Advantageously, a wide second radius of curvature R2 increases the ease of extraction of the tyre from the mould.

Preferably, the second radius of curvature R2 measured in any cross-section of the sipe 30 taken at the central portion 82 of the sipe 30 is greater than, or equal to, the second radius of curvature R2 measured in a cross-section of the sipe 30 taken at the axially inner portion 84 of the sipe 30.

Preferably, the second radius of curvature R2 varies with continuity, increasing, between the axially outer portion 83 of the sipe 30 and the central portion 82 of the sipe 30.

The second radius of curvature R2 can vary with continuity, decreasing or continuing to increase, between the central portion 82 of the sipe 30 and the axially inner portion 84 of the sipe 30.

Preferably, the ratio between the second radius of curvature R2 measured in any cross-section of the sipe 30 taken at the central portion 82 of the sipe 30 and the second radius of curvature R2 measured in a cross-section of the sipe 30 taken at the axially outermost end of the axially outer portion 83 of the sipe 30 is smaller than or equal to about 1.6, more preferably smaller than or equal to about 1.5.

Preferably, the ratio between the second radius of curvature R2 measured in any cross-section of the sipe 30 taken at the central portion 82 of the sipe 30 and the second radius of curvature R2 measured in a cross-section of the sipe 30 taken at the axially outermost end of the axially outer portion 83 of the sipe 30 is greater than or equal to about 1.

In a preferred embodiment, the ratio between the second radius of curvature R2 measured in any cross-section of the sipe 30 taken at the central portion 82 of the sipe 30 and the second radius of curvature R2 measured in a cross-section of the sipe 30 taken at the axially outermost end of the axially outer portion 83 of the sipe 30 is comprised between about 1 and about 1.6, the extreme values being included, more preferably between about 1 and about 1.5, the extreme values being included, for example equal to about 1.

Preferably, the ratio between the second radius of curvature R2 measured in any cross-section of the sipe 30 taken at the central portion 82 of the sipe 30 and the second radius of curvature R2 measured in a cross-section of the sipe 30 taken at the axially inner portion 84 of the sipe 30 is greater than or equal to about 1.

Preferably, the ratio between the second radius of curvature R2 measured in any cross-section of the sipe 30 taken at the central portion 82 of the sipe 30 and the second radius of curvature R2 measured in a cross-section of the sipe 30 taken at the axially inner portion 84 of the sipe 30 is smaller than or equal to about 10.

In the preferred embodiment, the ratio between the second radius of curvature R2 at the central portion 82 of the sipe 30 and the second radius of curvature R2 at the axially inner portion 84 of the sipe is comprised between about 1 and about 10, the extreme values being included, preferably between about 0.5 and about 8, the extreme values being included, for example equal to about 0.8.

The third radius of curvature R3 measured in a cross-section of the sipe 30 taken at the axially outer portion 83 of the sipe 30 is smaller than the third radius of curvature R3 of the side surfaces 453 measured in any cross-section of the sipe 30 taken at the central portion 82 of the sipe 30.

The third radius of curvature R3 varies with continuity, increasing, between the axially outer portion 83 of the sipe 30 and the central portion 82 of the sipe 30.

The third radius of curvature R3 varies with continuity, decreasing or continuing to increase, between the central portion 82 of the sipe 30 and the axially inner portion 84 of the sipe 30.

Preferably, the third radius of curvature R3 measured in a cross-section of the sipe 30 taken at the axially outer portion 83 of the sipe is smaller than, or equal to, the third radius of curvature R3 of the side surface 453 measured in a cross-section of the sipe 30 taken at the axially inner portion 84 of the sipe 30.

Preferably, the third radius of curvature R3 measured in any cross-section of the sipe 30 taken at the central portion 82 of the sipe 30 is smaller than, or equal to, the third radius of curvature R3 of the side surface 453 measured in a cross-section of the sipe 30 taken at the axially inner portion 84 of the sipe 30.

Preferably, in tyres 1 intended to be used in the front wheels of heavy vehicles, the sipe 30 described above is provided only on the blocks 20, 21 of said central annular portion A1.

Preferably, in tyres 1 intended to be used in the rear wheels of heavy vehicles, the sipe 30 described above is provided both on blocks 20, 21 of the central annular portion A1 and on blocks 23 of the annular shoulder portions A2, A3.

Although in the previous description explicit reference has been made to the sipes 30 illustrated in the attached drawings, what has been described with reference to the second transversal dimension L2 and/or to the first radius of curvature R1 and/or to the second radius of curvature R2 and/or to the third radius of curvature R3 has analogous application on sipes having a much simpler geometry, for example on sipes that extend along a rectilinear trajectory (i.e. without the aforementioned deformations 201, 202, 203) and/or that have a perfectly flat main portion 400 (i.e. without the aforementioned deformations 302, 303, 304, 305 and the aforementioned deformations 401, 402, 403).

The Applicant has sized the sipes 30 described above with reference to three different tyres. The measurements of such tyres are respectively 315/80 R22.5 (hereinafter such a tyre is indicated with P1), 315/70 R22.5 (hereinafter such a tyre is indicated with P2) and 295/80 R22.5 (hereinafter such a tyre is indicated with P3).

The table 1 below indicates, for each of the aforementioned tyres, the dimensions (in mm) of sipes 30. Column "S1" indicates the dimensions measured in a cross-section of the sipe 30 taken at the axially outer portion 83 of the sipe 30, whereas column "S2" indicates the dimensions measured in a cross-section of the sipe 30 taken at the central portion 82 of the sipe 30.

TABLE 1

|    | P1 | | P2 | | P3 | |
|----|----|----|----|----|----|----|
|    | S1 | S2 | S1 | S2 | S1 | S2 |
| H  | 13 | 13 | 12 | 12 | 11.5 | 11.5 |
| H1 | 8.5 | 8.9 | 8.5 | 8.7 | 8.5 | 8.9 |
| H2 | 4.5 | 4.1 | 3.5 | 3.3 | 3 | 2.6 |
| H3 | 0.9 | 1 | 0.8 | 0.8 | 0.7 | 0.8 |
| L1 | 0.6 | 0.6 | 0.6 | 0.6 | 0.6 | 0.6 |
| L2 | 3.2 | 2.2 | 2.8 | 1.9 | 2.2 | 1.5 |
| R1 | 14 | 5.6 | 14 | 5.6 | 10 | 3.7 |
| R2 | 2.8 | 2.9 | 2.53 | 2.7 | 2 | 2.7 |
| R3 | 1 | 1.2 | 0.9 | 1.2 | 0.7 | 1.1 |

The tread pattern illustrated in FIG. 2 is only an example of a high number of tread patterns that can actually be made according to the specific requirements. In particular, the number of blocks, sipes, transversal grooves, circumferential grooves, rows of blocks, blocks belonging to each row, the circumferential position of the blocks of one row with respect to that of the blocks of the axially adjacent row and/or the circumferential position of the blocks of the central portion of the tyre with respect to that of the blocks of the annular shoulder portions of the tyre can vary according to the specific use foreseen for the tyre, thus obtaining a tread pattern different from that illustrated in FIG. 2 but still within the scope of protection defined by the following claims.

There can also be provided tread patterns without the central groove, or with blocks, circumferential grooves and transversal grooves having a shape and/or size different from those described above with reference to FIG. 2.

Of course, those skilled in the art can bring further modifications and variants to the invention described above in order to satisfy specific and contingent application requirements, said variants and modifications in any case being within the scope of protection as defined by the following claims.

The invention claimed is:

1. A tyre for vehicle wheels, comprising:
   a tread band comprising a plurality of blocks, wherein one or more of the plurality of blocks comprises one or more sipes extending from an axially outer portion of the block up to an axially inner portion of the block and from a radially outer face of the block towards a radially inner portion of the block, and wherein the one or more sipes has a length and extends from the axially outer portion of the block to the axially inner portion of the block along a predetermined trajectory, and the one or more sipes comprises, in any cross-section perpendicular to the predetermined trajectory:
   a main portion having a first radial dimension and a first transversal dimension and, in a radially inner position with respect to the main portion and adjacent to the radially inner portion of the block,
   a bottom portion having a second radial dimension smaller than the first radial dimension and a second transversal dimension greater than the first transversal dimension, wherein the second transversal dimension measured in a first cross-section of the one or more sipes taken at one or more of the axially outer portions of the block and the axially inner portion of the block is greater than the second transversal dimension measured in a second cross-section of the one or more sipes taken at a portion of the block axially arranged between the axially outer portion of the block and the axially inner portion of the block, wherein the one or more sipes further comprises:
   an axially outer portion;
   an axially inner portion; and
   a central portion defined between the axially outer portion and the axially inner portion, wherein the one or more sipes comprises, in the central portion, at least one area in which the predetermined trajectory is not rectilinear and in which a plurality of deformations is arranged side by side in a radial direction wherein the second radial dimension of the bottom portion is substantially constant along the entire length of the sipe.

2. The tyre according to claim 1, wherein the one or more sipes extends from an axially outer face of the block up to an axially inner face of the block.

3. The tyre according to claim 1, wherein the second transversal dimension varies with continuity between the first cross-section of the one or more sipes and the second cross-section of the one or more sipes.

4. The tyre according to claim 1, wherein the first cross-section of the one or more sipes is taken at the axially outer portion and the second cross-section of the one or more sipes is taken at the central portion.

5. The tyre according to claim 4, wherein the second transversal dimension measured in the second cross-section of the one or more sipes is smaller than, or equal to, the second transversal dimension measured in a third cross-section of the one or more sipes taken at the axially inner portion.

6. The tyre according to claim 5, wherein the second transversal dimension measured in the first cross-section of the one or more sipes is greater than, or equal to, the second transversal dimension measured in the third cross-section of the one or more sipes.

7. The tyre according to claim 4, wherein the ratio between the second transversal dimension measured in the second cross-section of the one or more sipes and the second transversal dimension measured in the first cross-section of the one or more sipes ranges from about 0.15 to about 0.9.

8. The tyre according to claim 1, wherein the bottom portion comprises, in any cross-section perpendicular to the predetermined trajectory, a radially inner surface belonging to a circumference having a first radius of curvature, wherein the first radius of curvature measured in the first cross-section of the one or more sipes is greater than the first radius of curvature measured in the second cross-section of the one or more sipes.

9. The tyre according to claim 8, wherein the first radius of curvature varies with continuity between the first cross-section of the one or more sipes and the second cross-section of the one or more sipes.

10. The tyre according claim 8, wherein the second transversal dimension measured in the second cross-section of the one or more sipes is smaller than, or equal to, the second transversal dimension measured in a third cross-section of the one or more sipes taken at the axially inner portion, wherein the first radius of curvature measured in the second cross-section of the one or more sipes is smaller than, or equal to, the first radius of curvature measured in the third cross-section of the one or more sipes.

11. The tyre according to claim 8, wherein the second transversal dimension measured in the second cross-section of the one or more sipes is smaller than, or equal to, the second transversal dimension measured in a third cross-section of the one or more sipes taken at the axially inner portion, wherein the first radius of curvature measured in the first cross-section of the one or more sipes is greater than, or equal to, the first radius of curvature measured in the third cross-section of the one or more sipes.

12. The tyre according to claim 8, wherein the ratio between the first radius of curvature measured in the second cross-section of the one or more sipes and the first radius of curvature measured in the first cross-section of the one or more sipes ranges from about 0.1 to about 0.8.

13. The tyre according to claim 1, wherein the bottom portion comprises, in any cross-section perpendicular to the predetermined trajectory, opposite radially outer joining surfaces which join the bottom portion to the main portion of the one or more sipes through a second radius of curvature, wherein the second radius of curvature measured in the first cross-section of the one or more sipes is smaller than, or equal to, the second radius of curvature measured in the second cross-section of the one or more sipes.

14. The tyre according to claim 13, wherein the second radius of curvature varies with continuity between the first cross-section of the one or more sipes and the second cross-section of the one or more sipes.

15. The tyre according to claim 13, wherein the second transversal dimension measured in the second cross-section of the one or more sipes is smaller than, or equal to, the second transversal dimension measured in a third cross-section of the one or more sipes taken at the axially inner portion, wherein the second radius of curvature measured in the second cross-section of the one or more sipes is greater than, or equal to, the second radius of curvature measured in the third cross-section of the one or more sipes.

16. The tyre according to claim 13, wherein the ratio between the second radius of curvature measured in the second cross-section of the one or more sipes and the second radius of curvature measured in the first cross-section of the one or more sipes ranges from about 1 to about 1.6.

17. The tyre according to claim 1, wherein the tread band comprises a central annular portion astride of an equatorial plane of the tyre and two annular shoulder portions arranged on axially opposite sides with respect to the central annular portion, wherein the central annular portion is separated from each annular shoulder portion by a respective circumferential groove, and wherein the one or more sipes is provided only on blocks of the central annular portion.

18. The tyre according to claim 1, wherein the tread band comprises a central annular portion astride of an equatorial plane of the tyre and two annular shoulder portions arranged on axially opposite sides with respect to the central annular portion, wherein the central annular portion is separated from each annular shoulder portion by a respective circumferential groove, and wherein the one or more sipes is provided both on blocks of the central annular portion and on blocks of the annular shoulder portions.

19. A tyre for vehicle wheels, comprising:
a tread band having a tread surface and comprising a plurality of blocks, wherein one or more of the plurality of blocks comprises one or more sipes extending from an axially outer portion of the block up to an axially inner portion of the block and from a radially outer face of the block towards a radially inner portion of the block, and wherein the one or more sipes has a length and extends from the axially outer portion of the block to the axially inner portion of the block along a pre-determined trajectory, and the one or more sipes, in any cross-section perpendicular to the predetermined trajectory, comprises:
a main portion having a first radial dimension and a first transversal dimension and, in a radially inner position with respect to the main portion and adjacent to the radially inner portion of the block,
a bottom portion having a second radial dimension smaller than the first radial dimension and a second transversal dimension greater than the first transversal dimension, wherein the second transversal dimension measured in a first cross-section of the one or more sipes taken at one or more of the axially outer portions of the block and the axially inner portion of the block is greater than the second transversal dimension measured in a second cross-section of the one or more sipes taken at a portion of the block axially arranged between the axially outer portion of the block and the axially inner portion of the block, wherein the one or more sipes further comprises:
an axially outer portion in which the predetermined trajectory at the tread surface is rectilinear and in which a plurality of deformations is arranged side by side in a radial direction;
an axially inner portion in which the predetermined trajectory at the tread surface is rectilinear and in which a plurality of deformations is arranged side by side in a radial direction; and
a central portion defined between the axially outer portion and the axially inner portion, wherein the one or more sipes comprises, in the central portion, at least one area in which the predetermined trajectory is not rectilinear and in which a plurality of deformations is arranged side by side in a radial direction and a plurality of deformations is arranged side by side in an axial direction wherein the second radial dimension of the bottom portion is substantially constant along the entire length of the sipe.

20. The tyre according to claim 19, wherein the deformations on the axially outer portion and on the axially inner portion are arranged only on the main portion of the sipe and do not extend in the bottom portion of the sipe and the deformations.

21. The tyre according to claim 20, wherein the deformations arranged side by side in the axial radial direction on the central portion also extend both in the main portion and in the bottom portion of the sipe.

22. The tyre according to claim 19, wherein the deformations on the axially outer portion extend on a same side on the main portion of the sipe.

23. The tyre according to claim 19, wherein the deformations on the axially inner portion extend on a same side on the main portion of the sipe.

24. As claim 1, wherein a circumferential groove 6 is arranged astride of the equatorial plane (P) of the tyre and wherein the blocks are arranged in at least a pair of circumferential rows (9, 10) arranged on opposite sides with respect to the circumferential groove (6), wherein the sipes of the circumferential rows (9, 10) have opposite inclination to each other with respect to the equatorial plane (P).

* * * * *